United States Patent [19]

Leiboff et al.

[11] 3,739,083

[45] June 12, 1973

[54] DIGITAL SYSTEM FOR BAND WIDTH REDUCTION OF VIDEO SIGNALS

[75] Inventors: Teague N. Leiboff, Redondo Beach; Joseph W. Powers, Jr., Los Angeles; George H. Towner, Palos Verdes Penisula, all of Calif.

[73] Assignee: Northrup Corporation, Los Angeles, Calif.

[22] Filed: Aug. 4, 1971

[21] Appl. No.: 168,954

[52] U.S. Cl. .............. 178/6, 178/DIG. 3, 179/15.55
[51] Int. Cl. .............. H04n 7/12
[58] Field of Search .............. 178/DIG. 3; 179/15.55 R

[56] References Cited

UNITED STATES PATENTS

| | | | |
|---|---|---|---|
| 3,573,364 | 4/1971 | Shimamura et al. | 178/DIG. 3 |
| 2,906,816 | 9/1959 | Kretzmer | 178/DIG. 3 |
| 3,585,586 | 6/1971 | Harmon et al. | 178/DIG. 3 |
| 3,573,789 | 4/1971 | Sharp et al. | 178/DIG. 3 |
| 3,663,749 | 5/1972 | Cannon | 178/DIG. 3 |

*Primary Examiner*—Howard W. Britton
*Attorney*—Sokolski & Wohlgemuth and W. M. Graham

[57] ABSTRACT

Analog video signals which have a duty cycle which is substantially less than a total timing cycle are converted from analog to digital form in an analog to digital converter. These digital signals are fed to a time buffer where they are distributed over the entire timing cycle to lower their frequency so that the effective band width of such signals is substantially reduced. The time buffered signals are modulated onto an appropriate transmission carrier for transmission on a radio link or the like. These signals are received at the receiving station and appropriately processed to convert them back to their original analog form. In this manner, the band width of the transmission channel needed for transmitting the video signals may be substantially reduced.

6 Claims, 4 Drawing Figures

*INVENTORS*
TEAGUE N. LEIBOFF
JOSEPH W. POWERS, JR.
GEORGE H. TOWNER
*BY*
SOKOLSKI & WOHLGEMUTH
ATTORNEYS

INVENTORS
TEAGUE N. LEIBOFF
JOSEPH W. POWERS, JR.
GEORGE H. TOWNER
BY
SOKOLSKI & WOHLGEMUTH
ATTORNEYS

INVENTOR.
TEAGUE N. LEIBOFF
JOSEPH W. POWERS, JR.
GEORGE H. TOWNER

BY

SOKOLSKI & WOHLGEMUTH
ATTORNEYS

DIGITAL SYSTEM FOR BAND WIDTH REDUCTION OF VIDEO SIGNALS

This invention relates to the transmission of video information and more particularly to a system for reducing the band width of video signals by digital techniques, for transmission over a narrower band communications channel.

In certain systems, such as radars, which involve video information, there often is a situation where the duty cycle of the video information occupies only a minor portion of the total time cycle available. Thus, for example, the radar duty cycle may be only 25 percent with the remaining 75 percent of the time of each cycle being unused. The effective bandwidth of the video information is dependent upon the frequency or rate of the video signals. The bandwidth of the communications channel required to transmit these signals therefore is a direct function of their frequency. Hence, in situations where radar signals or the like are to be transmitted from a remote location such as, for example, on an aircraft or at a location in outer space, it is important in order to assure maximum utilization of the available communications channels, that this information has as narrow a bandwidth as possible. Thus, many efforts have been made in the past to compress the bandwidth of such signals by various techniques, such as multiplexing and the like. Many of these prior art approaches involve the processing of the video signals in their analog form and have the drawback that they are prone to the introduction of phase shift and other distortions into the signals, which make their accuracy less than to be desired.

The system of this invention provides improved means for decreasing the bandwidth of video signals by the use of digital time buffering. In implementing the system of this invention, the signals are first converted to digital form. They are then converted from serial to parallel form, and by digital delay and pulse stretching techniques distributed over the entire available time cycle. The signals are thus reduced in bandwidth for transmission to a receiving station. As the signals are in digital form, they are not subject to the phase shift and other distortions so common with analog signals. The transmission of the signals in digital form also makes the signal to noise ratio less critical. By full utilization of the time available, the bandwidth of the signals is decreased significantly so that optimum utilization of the communications channel is possible.

It is therefore an object of this invention to provide an improved technique for reducing the bandwidth of video signals.

It is another object of this invention to improve the efficiency of utilization of communications channels.

It is still a further object of this invention to provide an improved technique for digitally processing video signals for transmission wherein the distortion of such signals is minimized and the signal to noise ratio is less critical.

Other objects of this invention will become apparent as the description proceeds in connection with the accompanying drawings, of which:

Briefly described, the system of the invention is as follows:

A video signal which has a duty cycle which is a percentage of the total time cycle available is first converted from analog to digital form. The digital signals so derived are then transformed from serial to parallel form. The parallel signals are then fed to digital delay lines, the various signal components thereof being appropriately delayed and "stretched" so that they are distributed over the entire time cycle available. These digital signals are then modulated onto the carrier of a transmitter and transmitted to the receiving station where the above described process is reversed to produce the original analog video signal.

It is to be noted that the system of the invention is particularly applicable to a situation where the video of interest is defined in the basic equipment, which may comprise a radar system, by a timing gate or the like, such that the video occupies a specific defined portion of the total timing cycle. Thus, the analog video signal always appears in the same portion of the timing cycle such that its time of appearance is predictable. The system of the invention lowers the band requirements for transmitting this video by distributing it over the entire timing cycle, as now to be described.

Figure 1:
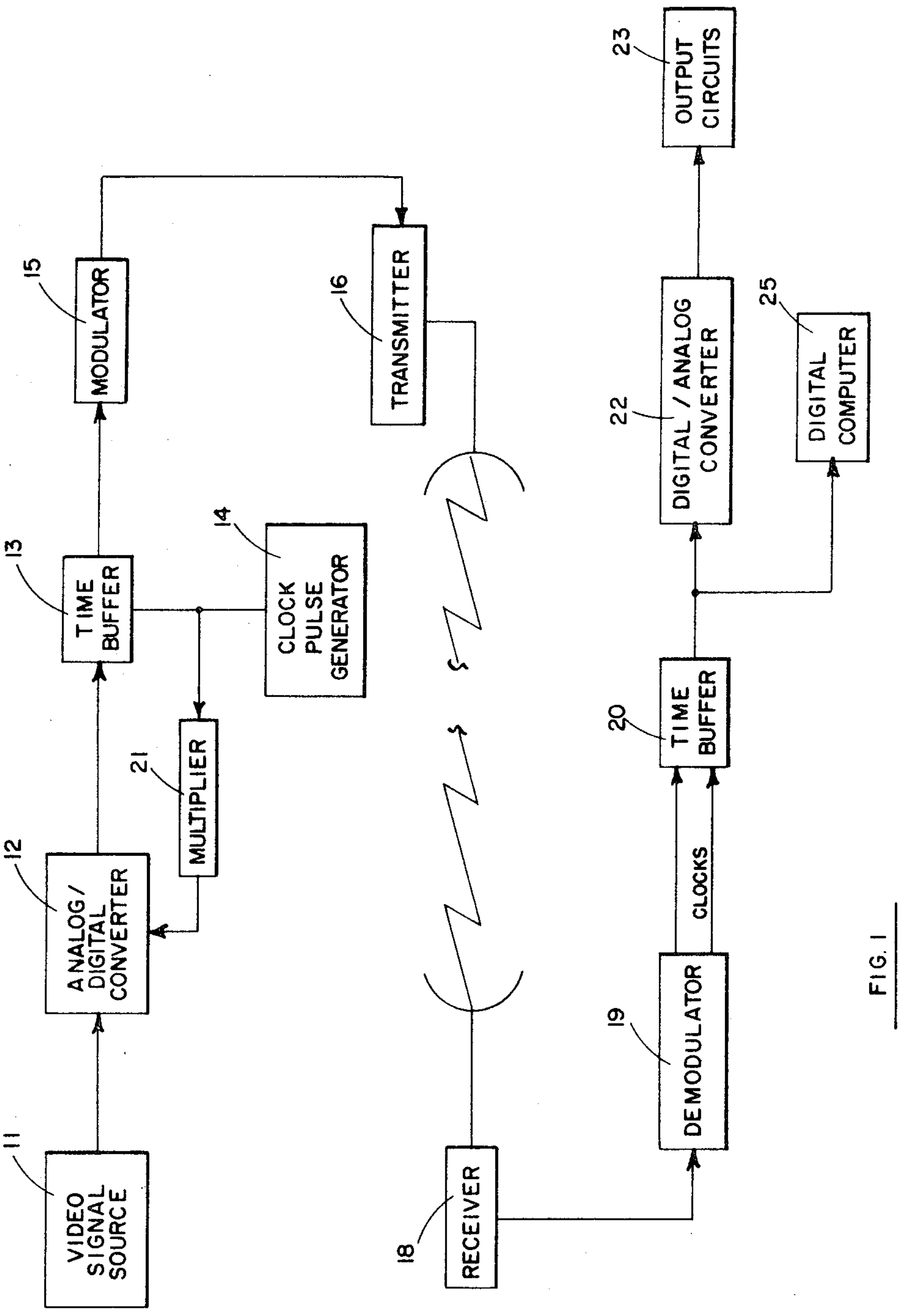
FIG. 1 is a block diagram illustrating the basic elements of the system of the invention.

Referring to FIG. 1, a block diagram illustrating the basic elements of the system of the invention is shown. Video signals from video signal source 11 which may comprise the video circuits of a radar receiver are fed to analog/digital converter 12 where they are placed in digital form. The output of converter 12 is fed to time buffer 13 where the digital signals are "stretched" and distributed over the total timing cycle. The operation of analog/digital converter 12 and time buffer 13 is synchronized by means of clock pulse generator 14. The output of clock pulse generator 14 is fed directly to time buffer 13 and multiplied by a factor in accordance with the bandwidth reduction to be achieved by means of multiplier 21 before being fed to analog/digital converter 12. The output of time buffer 13, which comprises a series of digital pulses representing the analog video signal, is fed to modulator 15 by means of which it is modulated on the carrier of radio transmitter 16. Transmitter 16 transmits the signals over an appropriate communications channel to receiver 18. Signals received by receiver 18 are demodulated by means of demodulator 19 and fed to time buffer 20 where they are appropriately processed to restore them to their original duty cycle. The output of buffer 20 is converted from digital to analog form by means of digital/analog converter 22. The output of digital/analog converter may be fed to output circuits 23 for appropriate utilization. If so desired, the digital output of time buffer 20 may be fed directly to a digital computer 25 for processing.

Figures 2, 3:
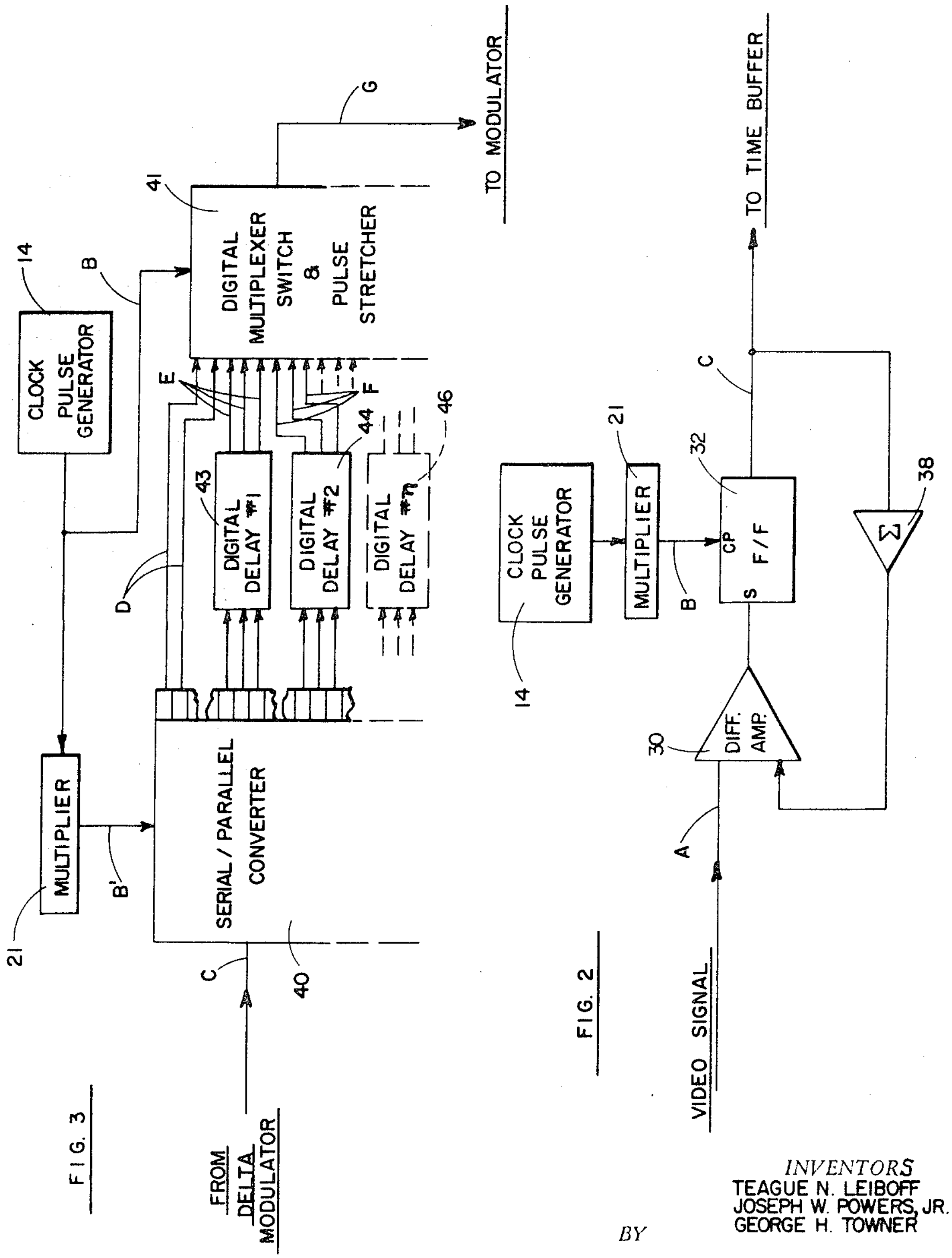
FIG. 2 is a functional block diagram of a delta modulator that may be utilized in the system of the invention.
FIG. 3 is a functional block diagram illustrating a time buffering circuit that may be utilized in the system of the invention.
Figure 4:
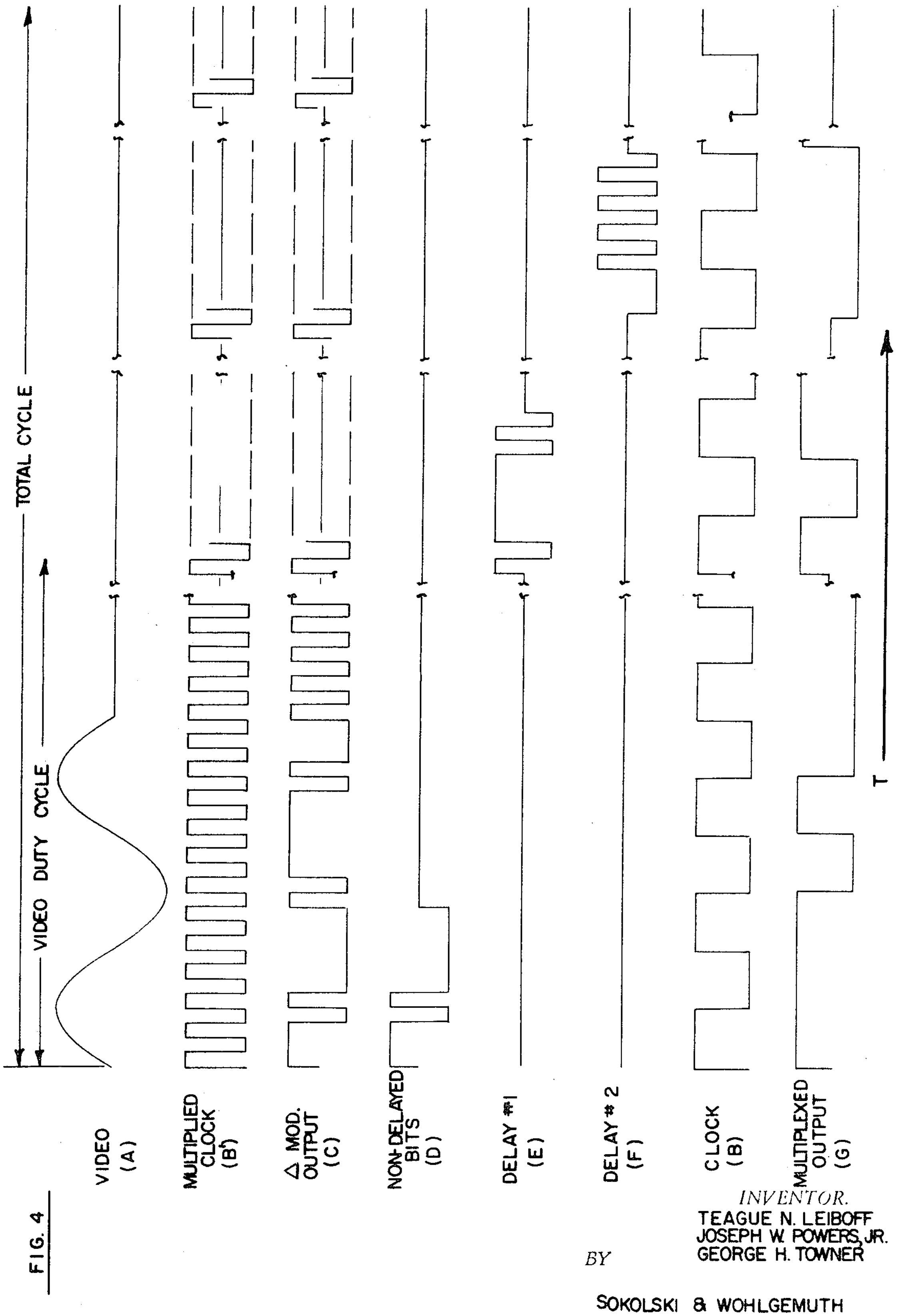
FIG. 4 illustrates a series of waveforms developed in the system of the invention.

Referring now to FIGS. 2 and 4, an analog to digital converter in the form of a delta modulator and waveforms generated therein are respectively illustrated. Corresponding letters are utilized in FIGS. 2 and 4 to identify the various wave shapes where they appear in the circuit. Video signal A is fed to differential amplifier 30. A portion of a typical video signal is shown for illustrative purposes. This signal normally would comprise a sine wave signal and harmonics thereof covering the entire duty cycle. The output of differential amplifier 30 is fed to flipflop 32. Also fed as a clock pulse to flipflop 32 are clock pulses B' from multiplier 21. Flipflop 32 has an output C which is fed to the time buffer for further processing. The output of the flipflop also is integrated by means of integrator 38 and fed as an input to differential amplifier 30 for comparison with the video signal. As can be seen in FIG. 4, delta modulator output C is the digital differential of the video input signal. When the slope of the video input signal is positive (i.e., on the positive going portions of the sine wave), the digital signal has a positive value. On the other hand, when the slope of the video is negative, the digital signal is negative. Where the slope of the video signal is zero, the digital signal comprises equal positive and negative pulses corresponding to the clock pulses to provide an average of zero. The output of the delta modulator thus is a train of pulses indicating both the magnitude and sign of the slope of the video signals.

Referring now to FIGS. 3 and 4, a time buffering circuit which may be utilized for distributing the digital signals over the entire duty cycle and waveforms developed in conjunction therewith are respectively illustrated. The signals C from the delta modulator are fed to serial/parallel converter 40 which may comprise a shift register operating in conjunction with logical gating circuitry. The gating of the output of the shift register forming serial/parallel converter 40 is appropriately gated by means of multiplied clock pulses from multiplier 21. Serial signals C from the delta modulator are thus stored in parallel form in the register comprising the serial/parallel converter and gated out simultaneously (1) directly to digital multiplexer switch and pulse stretcher 41, (2) through digital delay No. 1, 43, to the multiplexer, and (3) through digital delay No. 2, 44, to this multiplexer. In this manner, selected groups of the signals are separated from each other, each of these groups for transmission either in real time or with a different predetermined amount of time delay. Only a few bits of the digital information are shown going directly to the digital multiplexer switch and to each of the two digital delays for illustrative purposes. In a practical embodiment many hundreds of bits would go to each of the delay circuits and directly to the multiplexer. Also there could be additional delay circuits as indicated by Digital Delay No. "*n*," 46.

As can be seen in FIG. 4, the digital bits D fed directly to the digital multiplexer switch and pulse stretcher are in real time while the output signals E of digital delay No. 1 are delayed a first amount, while the output signals F of digital delay No. 2 are delayed a second amount, these two delays distributing the signals to different portions of the time cycle. Digital delay No. 1 and digital delay No. 2 may comprise shift registers which are designed to each delay the signals a predetermined different amount so that they are distributed as desired.

The various signals are multiplexed together and "stretched," so that they are effectively lowered in frequency so that they are effectively lowered in frequency by the band reduction factor, by digital multiplexer switch and pulse stretcher 41 to provide a serial output G on the output line which is fed to the modulator 15 (FIG. 1) for appropriate application to the carrier of the transmitter. Video information thus converted to digital form is effectively distributed over the entire time cycle and stretched so that its average rate is lower and thus its frequency and bandwidth are significantly reduced. In typical systems in which the technique of this invention has been utilized, those signals having a duty cycle of 12–25 percent have been distributed over a total time cycle such that the bandwidth requirements of the channel for transmitting such signals is reduced to one-eighth to one-fourth of its original requirements. It is to be noted that optimum utilization of the time cycle is made by sending some of the digital bits in real time in addition to those that are delayed and which appear in other portions of the time cycle than that encompassed by the original video duty cycle.

The system of this invention thus provides effective means for reducing the bandwidth requirements for transmitting video signals where such video signals originally have a duty cycle significantly shorter than the total time cycle involved.

While the system of this invention has been described and illustrated in detail, it is to be clearly understood that this is intended by way of illustration and example only and is not to be taken by way of limitation, the spirit and scope of this invention being limited only by the terms of the following claims.

We claim:

1. A system for converting video signals to a form for transmission over a reduced bandwidth channel comprising:

means for converting said signals from analog to digital form;

means for converting the digital signals so derived from serial to parallel form;

digital delay means for delaying preselected groups of said digital signals different predetermined amounts; and digital multiplexer switch and pulse stretcher means for receiving said delayed signals and a group of non-delayed signals directly from said converter means to place said signals in serial form distributed over a total time cycle.

2. The system of claim 1 wherein said digital delay means comprises first and second digital delay lines for each delaying a separate group of said signals a different predetermined amount.

3. The device of claim 1 wherein said serial to parallel converter means comprises a shift register.

4. The device of claim 1 wherein said digital delay means comprises a shift register for delaying each of said groups of signals.

5. The device of claim 1 wherein said means for converting said video signals from analog to digital form comprises a delta modulator.

6. A method for converting analog video signals from a form wherein they occupy a percentage of a total time cycle to a form wherein they occupy substantially the entire time cycle, comprising the steps of:

converting said signals from analog to digital form so that they comprise a train of pulses representing the sign and slope of said analog video signals;

converting said train of pulses to digital bits in parallel form;

delaying selected groups of bits of said digital signal different predetermined amounts; and multiplexing and stretching said delayed groups of bits and a group of bits of said digital signal which have not been delayed onto a single output line in serial form, whereby said digital signals are distributed over the total time cycle.

* * * * *